(12) United States Patent
Qi et al.

(10) Patent No.: US 10,787,593 B2
(45) Date of Patent: Sep. 29, 2020

(54) EMULSIFIABLE ISOCYANATE COMPOSITION AND PREPARATION METHOD AND USE THEREOF

(71) Applicant: WANHUA CHEMICAL GROUP CO., LTD., Shandong (CN)

(72) Inventors: Wangshun Qi, Shandong (CN); Zuolong Liu, Shandong (CN); Song Tu, Shandong (CN); Bo Wang, Shandong (CN); Xianbo Liu, Shandong (CN); Deqiang Ma, Shandong (CN); Bo Xin, Shandong (CN); Cheng Gong, Shandong (CN); Weiqi Hua, Shandong (CN)

(73) Assignee: WANHUA CHEMICAL GROUP CO., LTD., Shandong (CN)

( * ) Notice: Subject to any disclaimer, the term of this patent is extended or adjusted under 35 U.S.C. 154(b) by 50 days.

(21) Appl. No.: 15/571,358

(22) PCT Filed: Jul. 1, 2015

(86) PCT No.: PCT/CN2015/083045
§ 371 (c)(1),
(2) Date: Nov. 2, 2017

(87) PCT Pub. No.: WO2016/183907
PCT Pub. Date: Nov. 24, 2016

(65) Prior Publication Data
US 2018/0282593 A1 Oct. 4, 2018

(30) Foreign Application Priority Data

May 15, 2015 (CN) .......................... 2015 1 0245804

(51) Int. Cl.

| | | |
|---|---|---|
| C09J 175/06 | (2006.01) | |
| C09J 11/06 | (2006.01) | |
| C09J 175/08 | (2006.01) | |
| C08G 18/48 | (2006.01) | |
| C08G 18/42 | (2006.01) | |
| C08G 18/28 | (2006.01) | |
| C08G 18/76 | (2006.01) | |
| C08G 18/10 | (2006.01) | |
| C08G 18/72 | (2006.01) | |
| C08G 18/80 | (2006.01) | |
| C08G 18/69 | (2006.01) | |
| C08J 3/03 | (2006.01) | |
| C08G 18/62 | (2006.01) | |
| C08G 18/73 | (2006.01) | |
| C08G 18/75 | (2006.01) | |
| C09J 9/00 | (2006.01) | |

(52) U.S. Cl.
CPC .............. *C09J 11/06* (2013.01); *C08G 18/10* (2013.01); *C08G 18/283* (2013.01); *C08G 18/4202* (2013.01); *C08G 18/4238* (2013.01); *C08G 18/4277* (2013.01); *C08G 18/48* (2013.01); *C08G 18/4833* (2013.01); *C08G 18/4854* (2013.01); *C08G 18/4891* (2013.01); *C08G 18/6204* (2013.01); *C08G 18/69* (2013.01); *C08G 18/722* (2013.01); *C08G 18/73* (2013.01); *C08G 18/755* (2013.01); *C08G 18/758* (2013.01); *C08G 18/7621* (2013.01); *C08G 18/7664* (2013.01); *C08G 18/8064* (2013.01); *C08J 3/03* (2013.01); *C09J 9/00* (2013.01); *C09J 175/06* (2013.01); *C09J 175/08* (2013.01); *C08G 2170/80* (2013.01); *C08J 2375/06* (2013.01); *C08J 2375/08* (2013.01)

(58) Field of Classification Search
CPC ............ C08G 18/7664; C08G 18/8064; C08G 18/7621; C08G 18/758; C08G 18/73; C08G 18/4238; C08G 18/4833; C08G 18/4277; C08G 18/4891; C09J 11/06; C09J 175/08
See application file for complete search history.

(56) References Cited

U.S. PATENT DOCUMENTS

| | | | | |
|---|---|---|---|---|
| 3,996,154 A | * | 12/1976 | Johnson ................. | B01F 17/005 516/69 |
| 4,143,014 A | * | 3/1979 | McLaughlin .......... | C08G 18/10 428/319.7 |
| 4,257,996 A | * | 3/1981 | Farrissey, Jr. .......... | C08L 97/02 264/122 |

(Continued)

FOREIGN PATENT DOCUMENTS

| | | |
|---|---|---|
| CA | 1123817 A | 5/1982 |
| CA | 1277815 C | 12/1990 |

(Continued)

OTHER PUBLICATIONS

Canadian Office Action issued in Canadian Patent Application No. 2,985,210, dated Oct. 25, 2018.

(Continued)

*Primary Examiner* — Michael L Leonard
(74) *Attorney, Agent, or Firm* — Armstrong Teasdale LLP

(57) ABSTRACT

Provided are an emulsifiable isocyanate composition and a preparation method therefor. The emulsifiable isocyanate composition comprises the following components: (a) a polymethylene polyphenyl polyisocyanate, (b) an emulsifier, (c) an adduct derived from a diisocyanate, and optionally (d) a terpene monomer. The emulsifiable isocyanate composition is used in artificial board adhesives, and has a smaller mold cumulative effect, an improved demoulding performance and an extended pot life.

17 Claims, No Drawings

(56) References Cited

U.S. PATENT DOCUMENTS

| | | | | |
|---|---|---|---|---|
| 4,528,154 | A | * 7/1985 | Nguyen | B29C 33/64 |
| | | | | 264/109 |
| 5,468,833 | A | * 11/1995 | Schwindt | C08G 18/10 |
| | | | | 428/423.1 |
| 6,376,567 | B1 | * 4/2002 | Werner | C08G 18/10 |
| | | | | 521/130 |
| 6,531,536 | B2 | * 3/2003 | Shen | C08G 18/08 |
| | | | | 524/483 |
| 2003/0015122 | A1 | 1/2003 | Moriarty et al. | |
| 2010/0168287 | A1 | 7/2010 | Moriarty et al. | |
| 2012/0288720 | A1 | 11/2012 | Helmeke et al. | |

FOREIGN PATENT DOCUMENTS

| | | |
|---|---|---|
| CN | 1345906 A | 4/2002 |
| CN | 1467272 A | 1/2004 |
| CN | 1546621 A | 11/2004 |
| CN | 102459382 A | 5/2012 |
| CN | 102485821 A | 6/2012 |
| CN | 102807833 A | 12/2012 |
| WO | 2009150010 A1 | 12/2009 |

OTHER PUBLICATIONS

International Search Report for Application No. PCT/CN2015/083045, dated Feb. 19, 2016, 4 pages.
Written Opinion of the International Search Authority for Application No. PCT/CN2015/083045, dated Feb. 19, 2016, 4 pages.
Canadian Office Action issued in Canadian Patent Application No. 2,985,210, dated Oct. 4, 2019, 4 pages.

* cited by examiner

EMULSIFIABLE ISOCYANATE COMPOSITION AND PREPARATION METHOD AND USE THEREOF

TECHNICAL FIELD

The present invention relates to an emulsifiable isocyanate composition, especially to an emusifiable isocyanate composition adhesive for wood-based panel.

TECHNICAL BACKGROUND

At present, the commonly used synthetic adhesives for wood-based panel are formaldehyde-based adhesives represented by urea resin (UF), phenolic resin (PF), and melamine-formaldehyde resin, etc. Formaldehyde is used as a synthetic material for all of the above three kinds of adhesives, and cementing products would release formaldehyde during the process of production and use, which is regarded as one of the major sources of indoor air pollution. Such pollution has a long pollution cycle and is hard to be removed completely, which has been a trouble in the development of the composite wood industry.

Isocyanate adhesives that do not contain aldehydes have been more and more widely used recently because of environmental concerns. Except not containing formaldehyde, isocyanates have many advantages such as high bonding strength, fast curing, good water resistance and physical properties of boards and so on. However, there are also some disadvantages in using isocyanates as binder for wood-based panel: the isocyanates show very high reactivity and can react with most of the substances that contain reactive hydrogen to produce stable bonding of chemical bonds, which is one of their advantages as adhesives. However, during the process of production of wood-based panel, such property would cause the board sticking firmly to the press so that demoulding is hard to be carried out. In addition, based on the same theory, during the process of production, it is hard to avoid the accumulation of isocyanate adhesive reaction product on the press plates, which results in that the press cannot be used and must be washed. However, the washing process is a high cost process in itself and will greatly reduce the production efficiency. Therefore, those two phenomena are the difficulties in generalizing isocyanate adhesives in the industrial production of wood-based panel.

In order to solve the above problems, the technical solution in the prior art is to use release agents, including external release agent and internal release agent. For example, CN 1467272 A discloses a preparation method of an isocyanate water-based release agent based on paraffin for wood-based panel; CN1546621A discloses a preparation method of a release agent based on wax emulsions, aliphatic esters, phosphate esters and the salts thereof; US patent US2003/0015122A1 discloses a preparation method of an internal release agent which is an aqueous emulsion comprising polyolefin wax. However, although the use of release agents, especially internal release agents would solve the demoulding problem, it may cause disadvantageous results such as increasing the production cost and decreasing the bonding strength of wood-based panel. In addition, the large dosage of release agents would cause the corrosion of the belt of hot press. CN102459382A discloses a method of decreasing the accumulation effect of polyurethane adhesives on the surface of molds by adding aliphatic amine ethoxy compound masking agents, although the accumulation effect of the adhesives can be decreased by the method, the application amount of release agents cannot be decreased.

Therefore, it is still necessary to develop isocyanate adhesive products that can decrease the accumulation effect of the adhesives on molds, decrease the application amount of release agents, and reduce the operation labor and cost.

SUMMARY OF THE INVENTION

In order to overcome the above problems in the prior art, the present invention provides an emusifiable isocyanate composition. The composition, when used as an adhesive for producing wood-based artificial boards, can significantly improve the demoulding performance of the wood-based panel during the production process, decrease the accumulation effect of the adhesives on molds and reduce the dosage of release agents and the operation labor in production.

The present invention also provides a method for preparing said emusifiable isocyanate composition, which is easy to be operated and with low cost.

One technical solution of the present invention is as follows:

An emusifiable isocyanate composition, comprising the following components:
(a) a polymethylene polyphenyl polyisocyanate,
(b) an emulsifier,
(c) an adduct derived from a diisocycnate,
and optionally (d) a terpene monomer.

The NCO content of the polymethylene polyphenyl polyisocyanate of the present invention is 30-32 wt %, and the polymethylene polyphenyl polyisocyanate preferably selected from one or two or more of PM-100, PM-200, PM-400, PM-600 and PM-700 of Wanhua Chemical Group Co., LTD.

The emulsifier of the present invention is selected from one or two or more of ionic emulsifier and non-ionic emulsifier. Said ionic emulsifier or non-ionic emulsifier contains at least one hydrophilic group and at least one group that can react with isocyanates; wherein the hydrophilic group is selected from one or two or more of anionic groups, potential anionic groups and non-ionic groups that contain an ethylene oxide unit; wherein said group that can react with isocyanates is selected from one or two or more of hydroxyl, carboxyl, sulfydryl, primary amine and secondary amine.

Preferably, the anionic group or the potential anionic group contained in the ionic emulsifier of the present invention is carboxyl group and/or sulfonic acid group. The ionic emulsifier of the present invention is selected from one or two or more of hydroxypivalic acid, dimethylol propionic acid, aminobutyric acid, aminolauric acid, 2-(cyclohexylamido)ethanesulfonic acid and 3-(cyclohexylamido)propanesulfonic acid.

The non-ionic emulsifier of the present invention comprises 3-300, preferably 5-250, more preferably 10-200 ethylene oxide units, and the ethylene oxide units account for 10-100 wt %, preferably 20-95 wt % of the weight of the non-ionic emulsifier.

The non-ionic emulsifier can be selected from (1) ethylene oxide homopolymers and/or (2) copolymers of ethylene oxide and propylene oxide and/or butylene oxide and/or styrene oxide and/or (3) ring-opening polymerization products of ethylene oxide and one or two or more of aliphatic alcohols, alkylphenols and castor oil.

The ethylene oxide homopolymers of the present invention comprise one or two or more of polyoxyethylene monohydric alcohols and polyoxyethylene glycols.

Said polyoxyethylene monohydric alcohol of the present invention is preferably selected from allylpolyoxyethylene monohydric alcohols (APEG) and/or methoxy polyoxyethylene monohydric alcohols (MPEG). The number average molecular weight of the polyoxyethylene monohydric alcohols is 200-8000, preferably 300-5000, more preferably 400-3000.

An example of suitable allyl polyoxyethylene monohydric alcohols is one or two or more of APEG-700, APEG-800, APEG-900, APEG-1200, APEG 2400 of Haian Petrochemical Plant. An example of suitable methoxy polyethylene oxide mono-alcohol is one or two or more of MPEG-350, MPEG-550, MPEG-750, MPEG-950 and MPEG-1350 of the CARBOWAX MPEGs series products of DOW Chemical.

The number average molecular weight of said polyoxyethylene glycol of the present invention is 200-8000, preferably 300-5000, more preferably 400-3000.

An example of suitable polyoxyethylene glycols is one or two or more of PEG-300, PEG-400, PEG-600, PEG-1000, PEG-1450 and PEG-3350 of the CARBOWAX PEGS series products of DOW Chemical.

Except the ethylene oxide polymerization unit that must be contained in the polymerization unit of the copolymers of ethylene oxide and propylene oxide and/or butylene oxide and/or styrene oxide, the rest polymerization units are selected from one or two or more of propylene oxide, butylene oxide and styrene oxide. The polymerization units contain at least 3-300, preferably 5-250, more preferably 10-200 ethylene oxide units, and the weight ratio of the ethylene oxide units in the copolymers is 20-90 wt %, preferably 30-80 wt %, more preferably 50-75 wt %.

The number average molecular weight of said copolymers of ethylene oxide and propylene oxide and/or butylene oxide and/or styrene oxide is 500-20000, preferably 600-10000.

An example of suitable copolymers of ethylene oxide and propylene oxide and/or butylene oxide and/or styrene oxide is one or two or more of 50-HB-660, 50-HB-2000, 50-HB-3520, 50-HB-5100, 65-HB-1400 and 75-HB-9500 of the UCON series products of DOW Chemical.

The general formula of said ring-opening polymerization products of aliphatic alcohols and ethylene oxide of the present invention is $R_1$—O—$(CH_2CH_2O)_n$—H, wherein $R_1$ is a saturated or unsaturated C12-C18 alkyl, and it can be a linear or branched alkyl, wherein n is an integer, preferably 3-80, more preferably 5-50.

An example of suitable ring-opening polymerization products of aliphatic alcohols and ethylene oxide is one or two or more of AOE-3, AOE-7, AOE-9, AOE-15 and AOE-20 of Xingtai Lanxing additives factory, wherein the number in the name represents the average repetitions of the ethylene oxide unit in every polymer molecule.

The general formula of said ring-opening polymerization product of alkylphenols and ethylene oxide of the present invention is $CH_3(CH_2)_xC_6H_4O(C_2H_4O)_y$—H, wherein x is an integer of 5-10, wherein y is an integer, preferably 3-80, more preferably 5-50.

An example of suitable ring-opening polymerization products of alkylphenols and ethylene oxide is one or two or more of NP-6, NP-7, NP-10 and NP-20 of Xingtai Lanxing additives factory, wherein the number in the name represents the number of ethylene oxide units.

The number of ethylene oxide units of said ring-opening polymerization products of castor oil and ethylene oxide is 3-80, preferably 10-50. An example of suitable ring-opening polymerization products of castor oil and ethylene oxide is one or two or more of EL-10, EL-20 and EL-40 produced by Xingtai Lanxing additives factory, wherein the number in the name represents the average repetitions of ethylene oxide units in every polymer molecule.

Said emulsifier of the present invention can be a single type of the above emulsifiers, or be a mixture of two or more of the emulsifiers.

The weight ratio of the amount of said emulsifier of the present invention to the polymethylene polyphenyl polyisocyanate is 0.5-30 wt %, preferably 0.75-20 wt %, more preferably 1-15 wt %.

Said adduct derived from a diisocyanate of the present invention is the reaction product of dihydric alcohol(s) and diisocyanate(s); wherein the dihydric alcohol is selected from one or two or more of polysiloxane diol, polyoxyethylene glycol (PEG), polyoxypropylene glycol, polyoxyethylene-polyoxypropylene copolymer diol, polyethylene adipate diol, polybutylene adipate diol, polypropylene adipate diol, polybutadiene diol, polycaprolactone glycol and polytetrahydrofuran glycol (PTMEG).

The number average molecular weight of said dihydric alcohol of the present invention is 300-10000, preferably 400-8000, more preferably 500-4000.

An example of suitable dihydric alcohols is one or two or more of Placcel 205 (Daicel Chemical Industries co. LTD, Japan), CMA-24 (Huada Chemical co. LTD), CMA-44 (Huada Chemical co. LTD), ODX-218 (Huada Chemical co. LTD), DL-400 (Bluestar Dongda Chemical Industry Co. Ltd), DL-1000 (Bluestar Dongda Chemical Industry Co. Ltd), PEG-1000 (DOW Chemical), PEA-2000 (Huada Chemical co. LTD) and HTPB-4000 (Zibo Qilong Chemical Industry Co., LTD), PEBA-1500 (Taiwan Changxing Chemical co. LTD), PHA-2000 (Taiwan Changxing Chemical co. LTD), PEDA-1500 (Taiwan Changxing Chemical co. LTD), PTMEG-1000 (NVDIA); preferably one or two or more of Placcel 205, CMA-24, CMA-44, ODX-218, DL-400, DL-1000, PEG-1000, PEA-2000 and HTPB-4000.

Said diisocyanate of the present invention is selected from one or two or more of toluene diisocyanate (TDI), diphenylmethane diisocyanate, naphthalene diisocyanate, p-phenylenediisocyanate, dicyclohexylmethane diisocyanate (HMDI), hexamethylene diisocyanate (HDI) and isophorone diisocyanate (IPDI), preferably one or two or more of dicyclohexylmethane diisocyanate (HMDI), hexamethylene diisocyanate (HDI) and isophorone diisocyanate (IPDI).

The preparation method of said adduct derived from a diisocyanate of the present invention is well known to those skilled in the art, for example, the dihydric alcohol is added to the diisocyanate, and the temperature is kept at 60-70° C. to prepare the adduct derived from a diisocyanate. According to the present invention, the NCO content of the adduct derived from a diisocyanate is 2-25 wt %, preferably 4-20 wt %, more preferably 5-15 wt %.

The weight ratio of the amount of the adduct derived from a diisocyanate to the mixture of the polymethylene polyphenyl polyisocyanate and the emulsifier is 0.5-50 wt %, preferably 2-40 wt %, more preferably 3-30 wt %.

According to the present invention, said emulsifiable isocycnate composition optionally comprises a terpene monomer. In an embodiment of the present invention, the composition preferably comprises a terpene monomer.

Said terpene monomer of the present invention is an olefin compound with a molecular formula that is an integer multiple of isoprene, which complies with the general formula $(C_5H_8)n$, comprising hemiterpene (n=1), monoterpene (n=2), sesquiterpene (n=3), diterpene (n=4), tetra-terpene (n=8) and polyterpene (n>8), preferably one or two or more of α-pinene, β-pinene, limonene, geranene, camphene, limonene, zingiberene, camphorene and squalene, more preferably one or two or more of α-pinene, β-pinene, limonene, geranene, camphene, limonene, zingiberene, camphorene, further preferably one or two or more of α-pinene, β-pinene, limonene, geranene, camphene and limonene.

The weight ratio of the amount of said terpene monomer of the present invention to the polymethylene polyphenyl polyisocyanate is 0-25 wt %, preferably 0.1-20 wt %, more preferably 0.3-15 wt %, further preferably 0.5-10 wt %. The preparation method of said emusifiable isocyanate composition comprises the following steps: adding the emulsifier to the polymethylene polyphenyl polyisocyanate with stirring, wherein the reaction temperature is kept at 50-110° C., preferably 60-90° C., and the reaction time is 1-4 hours, preferably 2-3 hours; then adding the adduct derived from a diisocyanate; and optionally adding the terpene monomer at last.

The mechanisms of the emulsifiable isocyanate composition of the present invention with good demoulding performance and low accumulation effect on molds are as follows:

Said adduct derived from a diisocyanate is added to the composition in the present invention, and the amount of free isocyanate can be decreased in the composition because the adduct derived from a diisocycnate comprises a dihydric alcohol component, which is advantageous in reducing the accumulation of urea which is generated by free isocyanates and water, on the surface of the molds during the hot pressing process, and the urea is the major reason that adhesives accumulate on the surface of the molds. Meanwhile, the NCO content of the composition decreases because the amount of free isocyanate decreases. Therefore, the activity of the composition decreases, which results in a prolonged activity period of the composition.

The polarity of the terpene monomer is low and is very different from the polarity of isocyanates. When the composite modified isocyanate adhesive is mixed with wood material during the hot pressing process, part of the terpene monomer would migrate to the surface under pressure and heat because of the polarity difference between the terpene monomer and isocyanates, and form an isolation layer between the wood substrate and the molds, which prevents the contact of the adhesive and the molds by playing a role like release agents, and avoids the accumulation of the reaction product of the isocyanate adhesive and water in the wood material on the molds at the same time. When an internal release agent is used, since the internal release agent and the terpene monomer have similar polarities, during the migration process to the surface under heat and pressure, the latter will "carry" the internal release agent and migrate to the surface, i.e., the migration of both of them has a synergistic effect, resulting in more internal release agents accumulating at the interface between the board and the molds, and increasing the use efficiency of the internal release agent, thereby reducing the application amount of the release agent, and preventing the accumulation of the reaction product of the isocyanate adhesive and water in the wood material on the molds.

EMBODIMENTS

The following examples are provided for better illustrating the effect of the emulsifiable isocyanate composition of the present invention, and the specific selection of the components and modifiers in the examples listed below is not intended to limit the scope of the present invention.

The content of each component in the examples and comparative examples is represented by the weight ratio based on the polymethylene polyphenyl polyisocyanate.

Placcel 205, polycaprolactone diol, having a number average molecular weight of 530, Daicel Chemical Industry Co., Ltd., Japan;

PEG-1000, polyoxyethylene glycol, having a number average molecular weight of 1000, Dow Chemical;

PEG-3350, polyoxyethylene glycol, having a number average molecular weight of 3350, Dow Chemical;

CMA-44, polybutylene adipate diol, having a number average molecular weight of 2000, Huada Chemical Co., Ltd.;

HTPB-4000, polybutadiene diol, having a number average molecular weight of 4000, Zibo Qilong Chemical Co., Ltd.;

PTMEG-1000, polytetrahydrofuran ether, having a number average molecular weight of 1000, NVDIA;

CMA-24, polyethylene adipate diol, having a number average molecular weight of 2000, Huada Chemical Co., Ltd.;

PTMGE-3000, polytetrahydrofuran ether, having a number average molecular weight of 3000, NVDIA;

TDI-100, toluene diisocyanate, BorsodChemCo., Ltd.;

TDI-80, toluene diisocyanate, BorsodChemCo., Ltd.;

HDI, hexamethylene diisocyanate, Wanhua Chemical Group Co., Ltd.

HMDI, dicyclohexylmethane diisocyanate, Wanhua Chemical Group Co., Ltd.

IPDI, isophorone diisocyanate, Wanhua Chemical Group Co., Ltd.

Preparation of the Adduct Derived from a Diisocyanate

A diisocyanate was heated to 60-70° C., and then a difunctional polyol was added to the diisocyanate with stirring. The reaction was carried out for 2-3 hours at 60-70° C. to obtain the adduct derived from a diisocycnate. The reaction conditions and results of the adduct are shown in Table 1.

TABLE 1 the reaction conditions and results of the adduct

| Adduct No. | Polyol | The molecular weight of the polyol | The name of the isocyanate | The weight ratio of isocycnate/polyol | The NCO content of the adduct wt % |
| --- | --- | --- | --- | --- | --- |
| 1# | Placcel 205 | 530 | TDI-100 | 93.9/100 | 15 |
| 2# | PEG-1000 | 1000 | HMDI | 49.6/100 | 5 |
| 3# | PEG-3350 | 3350 | TDI-100 | 23.1/100 | 7 |
| 4# | PEA-2000 | 2000 | HDI | 35.6/100 | 10 |

TABLE 1-continued the reaction conditions and results of the adduct

| Adduct No. | Polyol | The molecular weight of the polyol | The name of the isocyanate | The weight ratio of isocycnate/polyol | The NCO content of the adduct wt % |
|---|---|---|---|---|---|
| 5# | HTPB-4000 | 4000 | IPDI | 55.1/100 | 12 |
| 6# | PTMEG-1000 | 1000 | HMDI | 68.5/100 | 8 |
| 7# | CMA-24/CMA-44 with weight ratio of 1:1 | 2000 | TDI-80 | 48.9/100 | 13 |
| 8# | PTMGE-3000 | 3000 | HDI/IPDI with weight ratio of 1:1 | 51.5/100 | 6 |

Example 1

100 parts by weight of PM-200 was heated to 50° C., and 3 parts by weight of methoxypolyethylene glycol monoglycol MPEG-550 (Dow Chemical) was added to PM-200 with stirring. The reaction temperature was kept at 60° C., and the reaction was carried out for 2 hours to obtain the reaction product of PM-200 and the emulsifier. After the reaction was completed, 3 parts by weight of adduct 1# was added to the reaction product to obtain emusifiable isocyanate composition 1#, i.e. adhesive 1#.

Example 2

The mixture of 100 parts by weight of PM-700 and PM-200 (1/1, w/w) was heated to 60° C., and 2 parts by weight of the ring-opening polymerization product of alkylphenol and ethylene oxide NP-10 (Xingtai Lanxing additives factory) was added to the mixture of PM-700 and PM-200 (1/1) with stirring. The reaction temperature was kept at 60° C., and the reaction was carried out for 3 hours to obtain the reaction product of the mixture and the emulsifier. After the reaction was completed, 12 parts by weight of adduct 7# was added to the reaction product to obtain emusifiable isocyanate composition 2#, i.e. adhesive 2#.

Example 3

The mixture of 100 parts by weight of PM-400 and PM-600 (2/3, w/w) was heated to 60° C., and 13 parts by weight of the ring-opening polymerization product of castor oil and ethylene oxide EL-40 (Xingtai Lanxing additives factory) was added to the mixture of PM-400 and PM-600 (2/3) with stirring. The reaction temperature was kept at 60° C., and the reaction was carried out for 3 hours to obtain the reaction product of the mixture and the emulsifier. After the reaction was completed, 6 parts by weight of adduct 8# was added to the reaction product and stirred until it was completely dissolved to obtain emusifiable isocyanate composition 3#, i.e. adhesive 3#.

Example 4

100 parts by weight of PM-200 was heated to 50° C., and 1 part by weight of hydroxypivalic acid was added to PM-200 with stirring. The reaction temperature was kept at 60° C., and the reaction was carried out for 3 hours to obtain the reaction product of PM-200 and the emulsifier. After the reaction was completed, 10 parts by weight of adduct 1# was added to the reaction product. At last, 10 parts by weight of α-pinene (Jiangxi Hexin Chemical Co., Ltd.) was added to the mixture and stirred until it was completely dissolved to obtain emusifiable isocyanate composition 4#, i.e. adhesive 4#.

Example 5

100 parts by weight of PM-200 was heated to 50° C., and 3 parts by weight of methoxypolyethylene glycol monoglycol MPEG-550 (Dow Chemical) was added to PM-200 with stirring. The reaction temperature was kept at 60° C., and the reaction was carried out for 2 hours to obtain the reaction product of PM-200 and the emulsifier. After the reaction was completed, 3 parts by weight of adduct 2# was added to the reaction product. At last, 0.5 parts by weight of limonene (Shanghai Nine Orange Industry Co., Ltd.) was added to the mixture and stirred until it was completely dissolved to obtain emusifiable isocyanate composition 5#, i.e. adhesive 5#.

Example 6

100 parts by weight of PM-400 was heated to 50° C., and 8 parts of polyoxyethylene glycol PEG-3350 (Dow Chemical) was added to PM-400 with stirring. The reaction temperature was kept at 70° C., and the reaction was carried out for 2 hours to obtain the reaction product of PM-400 and the emulsifier. After the reaction was completed, 30 parts by weight of adduct 3# was added to the reaction product. At last, 1 part by weight of geranene (Jiangxi Hexin Chemical Co., Ltd.) was added to the mixture and stirred until it was completely dissolved to obtain emusifiable isocyanate composition 6#, i.e. adhesive 6#.

Example 7

100 parts by weight of PM-600 was heated to 60° C., and 15 parts by weight of copolymer of ethylene oxide and propylene oxide 50-HB-660 (Dow Chemical) was added to PM-600 with stirring. The reaction temperature was kept at 70° C., and the reaction was carried out for 3 hours to obtain the reaction product of PM-600 and the emulsifier. After the reaction was completed, 20 parts by weight of adduct 4# was added to the reaction product. At last, 5 parts by weight of β-pinene (Jiangxi Hexin Chemical Co., Ltd.) was added to the mixture and stirred until it was completely dissolved to obtain emusifiable isocyanate composition 7#, i.e. adhesive 7#.

Example 8

100 parts by weight of PM-700 was heated to 60° C., and 6 parts by weight of the copolymer of ethylene oxide and propylene oxide 75-HB-9500 (Dow Chemical) was added to PM-700 with stirring. The reaction temperature was kept at 70° C., and the reaction was carried out for 3 hours to obtain the reaction product of PM-700 and the emulsifier. After the reaction was completed, 5 parts by weight of adduct 5# was added to the reaction product. At last, 3 parts by weight of camphene (Wuxi Huishen Chemical Co., Ltd.) was added to the mixture and stirred until it was completely dissolved to obtain emusifiable isocyanate composition 8#, i.e. adhesive 8#.

Example 9

100 parts by weight of PM-200 was heated to 60° C., and 2 parts by weight of allyl polyethylene oxide mono-alcohol APEG-700 (Haian Petrochemical Plant) and 2 parts by weight of ring-opening polymerization product of ethylene oxide AOE-20 (Xingtai Lanxing additive plant) with fatty alcohol as the initiator were added to PM-200 with stirring. The reaction temperature was kept at 60° C., and the reaction was carried out for 3 hours to obtain the reaction product of PM-200 and the emulsifier. After the reaction was completed, 15 parts by weight of adduct 6# was added to the reaction product. At last, 4 parts by weight of α-pinene and 1 part by weight of β-pinene (Jiangxi Hexin Chemical Co., Ltd.) were added to the mixture and stirred until they were completely dissolved to obtain emusifiable isocyanate composition 9#, i.e. adhesive 9#.

Example 10

100 parts by weight of the mixture of PM-700 and PM-200 (1/1, w/w) was heated to 60° C., and 2 parts by weight of the ring-opening polymerization product of alkylphenol and ethylene oxide NP-10 (Xingtai Lanxing additive factory) was added to the mixture of PM-700 and PM-200 (1/1) with stirring. The reaction temperature was kept at 60° C., and the reaction was carried out for 3 hours to obtain the reaction product of the mixture and the emulsifier. After the reaction was completed, 12 parts by weight of adduct 7# was added to the reaction product. At last, 3 parts by weight of α-pinene and 2 parts by weight of β-pinene (Jiangxi Hexin Chemical Co., Ltd.) were added to the mixture and stirred until they were completely dissolved to obtain emusifiable isocyanate composition 10#, i.e. adhesive 10#.

Example 11

100 parts by weight of the mixture of PM-400 and PM-600 (2/3, w/w) was heated to 60° C., and 13 parts by weight of the ring-opening polymerization product of castor oil and ethylene oxide EL-40 (Xingtai Lanxing Additive Factory) was added to the mixture of PM-400 and PM-600 (2/3) with stirring. The reaction temperature was kept at 60° C., and the reaction was carried out for 3 hours to obtain the reaction product of the mixture and the emulsifier. After the reaction was completed, 6 parts by weight of adduct 8# was added to the reaction product. At last, 10 parts by weight of β-pinene (Jiangxi Hexin Chemical Co., Ltd.) was added to the mixture and stirred until it was completely dissolved to obtain emusifiable isocyanate composition 11#, i.e. adhesive 11#.

Comparative Example 1

100 parts by weight of PM-200 was heated to 50° C., and 3 parts by weight of methoxypolyoxyethylene monohydric alcohol MPEG-550 (Dow Chemical) was added to PM-200 with stirring. The reaction temperature was kept at 60° C., and the reaction was carried out for 2 hours to obtain emulsifiable isocyanate composition 12#, i.e., adhesive 12#.

Comparative Example 2

100 parts by weight of the mixture of PM-700 and PM-200 (1/1, w/w) were heated to 60° C., and 2 parts by weight of the ring-opening polymerization product of alkylphenol and ethylene oxide NP-10 (Xingtai Lanxing Additive Factory) was added to the mixture of PM-700 and PM-200 (1/1) with stirring. The reaction temperature was kept at 60° C., and the reaction was carried out for 3 hours to obtain emulsifiable isocyanate composition 13#, i.e., adhesive 13#.

Comparative Example 3

100 parts by weight of the mixture of PM-400 and PM-600 (2/3, w/w) were heated to 60° C., and 13 parts by weight of the ring-opening polymerization product of castor oil and ethylene oxide EL-40 (Xingtai Lanxing Additive Factory) was added to the mixture of PM-400 and PM-600 (2/3) with stirring. The reaction temperature was kept at 60° C., and the reaction was carried out for 3 hours to obtain the reaction product of the mixture and the emulsifier, which is emulsifiable isocyanate composition 14#, i.e., adhesive 14#.

Board-Pressing Test

A pine wood fiber with a moisture content of 8.5-10 wt % was selected as the wood substrate for the Board-pressing test. 10 g of emulsifiable isocyanate compositions (adhesives) 1 to 14# was weighed out respectively, to which the internal releasing agent I-Release MDF 9130 that was purchased from Huntsman Co., Ltd was added according to the proportions shown in table 2 (the amount of the release agent was calculated based on the weight of the emulsifiable isocyanate composition), and then 10 g of water was added respectively. Each mixture was stirred vigorously to obtain a mixed emulsion. The above mixed emulsion was added to a spray gun connected to an air compressor. 200 g of the pine fiber was weighed out and then added into a mixer, under the condition of stirring, the mixed emulsion was injected to the mixer by the sprayed gun and stirred for 40-60 s. The pine wood fiber was removed, and the fiber was dried in a blast oven until the moisture content reaches to 4-5 wt %. The fiber was pre-pressed manually between two metal plate molds into a slab with a size of about 200 mm×200 mm×20 mm, then the metal plate molds and the slab were transferred to a hot press for hot pressing. The temperature for pressing the slab was 195-200° C., the relative pressure was 1.5-2 MPa, the holding time was 70 s, and the thickness of the slab was controlled to 6 mm. After the compression was completed, the maximum tensile force for opening the molds and the finished product was measured by an universal material testing machine at a speed of 50 mm/min to reflect the ease of board demoulding.

The above steps were repeated with the same pair of metal plate molds, and 30 boards were pressed continuously. The weight increased per unit area of the metal plate molds was calculated to obtain the data of cumulative effect, and the mold cumulative effect and the demoulding effect were shown in Table 2.

TABLE 2 mold cumulative effect and demoulding effect

| Adhesive | 1# | 1# | 2# | 3# | 4# | 5# | 6# | 7# | 8# | 9# | 10# | 11# | 12# | 13# | 14# |
|---|---|---|---|---|---|---|---|---|---|---|---|---|---|---|---|
| The amount of release agent wt % | 7 | 10 | 10 | 10 | 7 | 7 | 7 | 7 | 7 | 7 | 7 | 7 | 10 | 10 | 10 |
| Average tensile force N | 317 | 64 | 305 | 286 | 24 | 31 | 28 | 41 | 22 | 35 | 33 | 43 | 513 | 541 | 524 |
| Cumulative effect g/m² | 345.8 | 195.6 | 184.3 | 163.9 | 58.2 | 74.0 | 86.5 | 56.4 | 61.2 | 78.6 | 65.4 | 71.7 | 779.2 | 804.5 | 791.3 |
| Pot life h | 3.8 | 4.0 | 4.2 | 4.4 | 5.0 | 4.4 | 4.6 | 4.2 | 4.4 | 4.4 | 4.6 | 5.0 | 2.2 | 2.4 | 2.1 |

As can be seen from the table above, after the adduct derived from a diisocyanate of the present invention was added to the compositions (adhesives 1-3#), the pot life of the adhesives was significantly prolonged and the cumulative effect of the adhesives on the molds was reduced.

It can be seen from the comparison test results of adhesives 4-11# and adhesives 12-14#, on one hand, adhesives 4-11# that contain terpene monomers can decrease the application amount of the internal release agent from 10 wt % to 7 wt %, while maintaining good demoulding performance; on the other hand, comparing adhesives 4-11# with adhesives 1-3#, the accumulation of the adhesives on the molds was significantly decreased, which indicates that the emulsifiable isocyanate composition provided by the present invention can largely decrease the cumulative effect of the adhesives on the molds during the production process of wood-based panel, and reduce the efficiency decrease and the cost increase due to cleaning the molds.

The invention claimed is:

1. An emusifiable isocyanate composition used in adhesives for wood-based panel, wherein said composition comprises the following components:
   (a) a polymethylene polyphenyl polyisocyanate having an NCO content of 30-32 wt %,
   (b) an emulsifier in an amount of 0.5-30 wt % relative to the weight of said polymethylene polyphenyl polyisocyanate,
   (c) an adduct derived from a diisocyanate having an NCO content of 2-25 wt %, said adduct derived from a diisocyanate is a reaction product of dihydric alcohol(s) and diisocyanate(s), the number average molecular weight of said dihydric alcohol is 400-8000,
   and (d) a terpene monomer.

2. The emusifiable isocyanate composition according to claim 1, wherein the emulsifier is selected from one or two or more of ionic emulsifier and non-ionic emulsifier, which contains at least one hydrophilic group and at least one group that can react with isocyanates, wherein the hydrophilic group is selected from one or two or more of anionic groups, potential anionic groups and non-ionic groups containing an ethylene oxide unit, wherein said group that can react with isocyanates is selected from one or two or more of hydroxyl, carboxyl, sulfhydryl, primary amine and secondary amine.

3. The emusifiable isocyanate composition according to claim 2, wherein the ionic emulsifier is selected from one or two or more of hydroxypivalic acid, dimethylol propionic acid, aminobutyric acid, aminolauric acid, 2-(cyclohexylamido)ethanesulfonic acid and 3-(cyclohexylamido) propanesulfonic acid; the non-ionic emulsifier is selected from (1) ethylene oxide homopolymers and/or (2) copolymers of ethylene oxide and propylene oxide and/or butylene oxide and/or styrene oxide and/or (3) ring-opening polymerization products of ethylene oxide and one or two or more of aliphatic alcohols, alkylphenols and castor oil.

4. The emusifiable isocyanate composition according to claim 3, wherein said (1) ethylene oxide homopolymers comprise one or two or more of polyoxyethylene monohydric alcohols and polyoxyethylene glycols.

5. The emusifiable isocyanate composition according to claim 4, wherein said polyoxyethylene monohydric alcohols are selected from allylpolyoxyethylene monohydric alcohols and/or methoxy polyoxyethylene monohydric alcohols; the number average molecular weight of the polyoxyethylene monohydric alcohols is 200-8000, and the number average molecular weight of said polyoxyethylene glycols is 200-8000.

6. The emusifiable isocyanate composition according to claim 3, wherein the number average molecular weight of said (2) copolymers of ethylene oxide and propylene oxide and/or butylene oxide and/or styrene oxide is 500-20000; the copolymers contain at least 3-300 ethylene oxide units; the ethylene oxide units account for 20-90 wt % of the copolymers.

7. The emusifiable isocyanate composition according to claim 3, wherein a general formula of said ring-opening polymerization products of aliphatic alcohols and ethylene oxide is $R_1$—O—$(CH_2CH_2O)_n$—H, wherein $R_1$ is a saturated or un saturated linear or branched C12-C18 alkyl, wherein n is 3-80;
   a general formula of said ring-opening polymerization products of alkylphenol and ethylene oxide is $CH_3(CH_2)_xC_6H_4O(C_2H_4O)_y$—H, wherein x is 5-10, y is 3-80;
   the number of ethylene oxide units of said ring-opening polymerization products of castor oil and ethylene oxide is 3-80.

8. The emusifiable isocyanate composition according to claim 1, wherein, based on the weight of the adduct, the NCO content is 4-20 wt %.

9. The emusifiable isocyanate composition according to claim 1, wherein a application amount of said emulsifier relative to the weight of the polymethylene polyphenyl polyisocyanate is 0.75-20 wt %; the amount of said adduct derived from a diisocyanate relative to the weight of the mixture of the polymethylene polyphenyl polyisocyanate and the emulsifier is 0.5-50 wt %.

10. The emusifiable isocyanate composition according to claim 1, wherein said terpene monomer comprises one or two or more of hemiterpene, monoterpene, sesquiterpene, diterpene, tetra-terpene and polyterpene; a application amount of said terpene monomer relative to the weight of the polymethylene polyphenyl polyisocyanate is 0.1-20 wt %.

11. A method for preparing the emusifiable isocyanate composition used in adhesives for wood-based panel according to claim 1, wherein said method comprises the following steps: adding the emulsifier to the polymethylene polyphenyl polyisocyanate, wherein the reaction temperature is kept at 50-110° C. and the reaction time is 1-4 hours; then adding the adduct derived from a diisocyanate; and adding the terpene monomer at last;

wherein the NCO content of the polymethylene polyphenyl polyisocyanate is 30-32 wt %;

said adduct derived from a diisocyanate is selected from the reaction product of dihydric alcohol(s) and diisocyanate(s), based on the weight of the adduct, the NCO content is 2-25 wt %, the number average molecular weight of said dihydric alcohol is 400-8000; and a application amount of said emulsifier relative to the weight of the polymethylene polyphenyl polyisocyanate is 0.5-30 wt %.

12. A method of using the emusifiable isocyanate composition according to claim 1, wherein the emusifiable isocyanate composition is used in adhesives for wood-based panel.

13. The emusifiable isocyanate composition according to claim 8, wherein, based on the weight of the adduct, the NCO content is 5-15 wt %.

14. The emusifiable isocyanate composition according to claim 9, wherein the application amount of said emulsifier relative to the weight of the polymethylene polyphenyl polyisocyanate is 1-15 wt %; the amount of said adduct derived from a diisocyanate relative to the weight of the mixture of the polymethylene polyphenyl polyisocyanate and the emulsifier is 2-40 wt %.

15. The emusifiable isocyanate composition according to claim 14, wherein the amount of said adduct derived from a diisocyanate relative to the weight of the mixture of the polymethylene polyphenyl polyisocyanate and the emulsifier is 3-30 wt %.

16. The emusifiable isocyanate composition according to claim 10, wherein the application amount of said terpene monomer relative to the weight of the polymethylene polyphenyl polyisocyanate is 0.3-15 wt %.

17. The emusifiable isocyanate composition according to claim 10, wherein the application amount of said terpene monomer relative to the weight of the polymethylene polyphenyl polyisocyanate is 0.5-10 wt %.

* * * * *